C. A. HUFFMASTER.
HAT PIN PROTECTOR.
APPLICATION FILED NOV. 6, 1911.
1,024,337.
Patented Apr. 23, 1912.
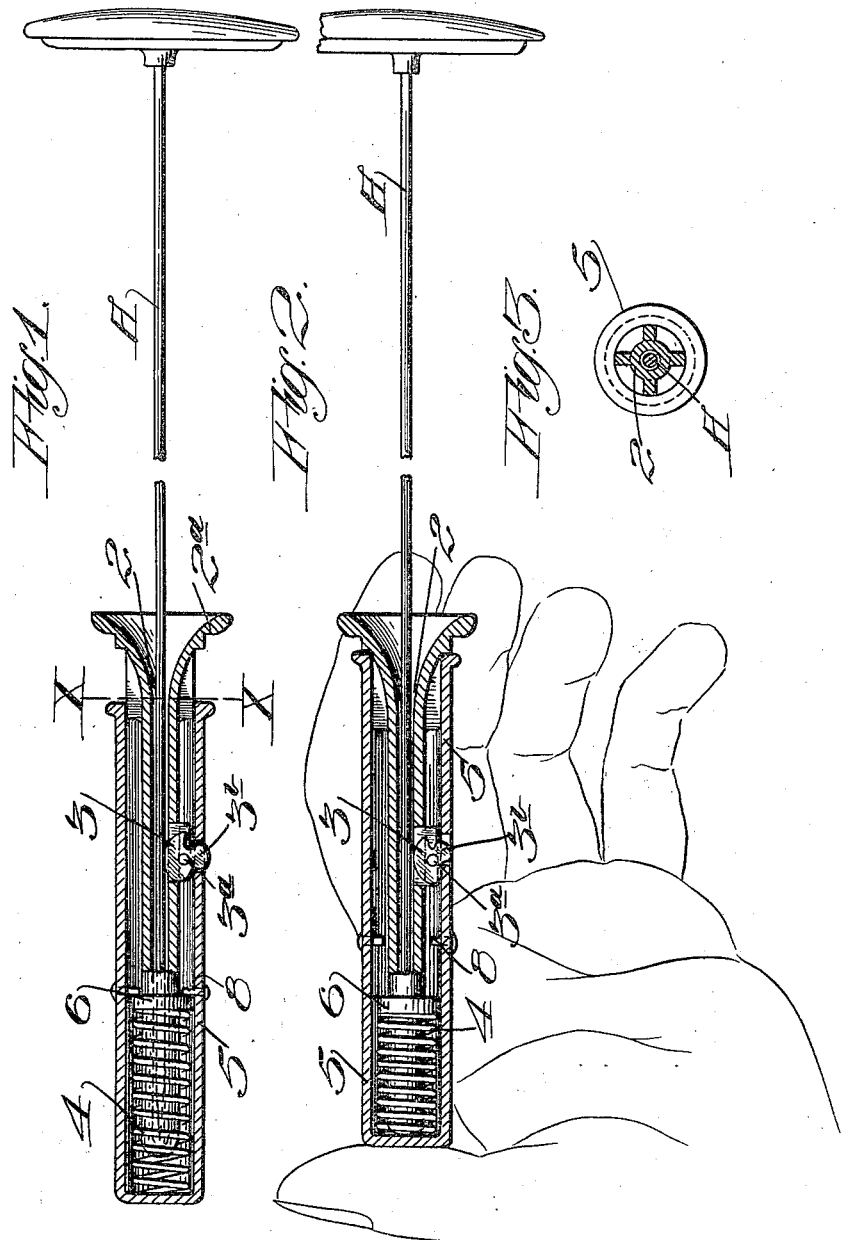

UNITED STATES PATENT OFFICE.

CHARLES A. HUFFMASTER, OF SAN LEANDRO, CALIFORNIA.

HAT-PIN PROTECTOR.

1,024,337. Specification of Letters Patent. Patented Apr. 23, 1912.

Application filed November 6, 1911. Serial No. 658,795.

*To all whom it may concern:*

Be it known that I, CHARLES A. HUFFMASTER, a citizen of the United States, residing at San Leandro, in the county of Alameda and State of California, have invented new and useful Improvements in Hat-Pin Protectors, of which the following is a specification.

My invention relates to an improvement in a guard or device for protecting the points of hat pins and for like purposes.

It consists in the combination of concentric relatively movable tubes, into the inner end of which the point of the pin may be inserted, a holding cam and actuating spring by which they are normally engaged, and means by compression of the spring, the cam may be moved to disengage and allow the pin to be withdrawn.

It also comprises details of construction, which will be more fully explained by reference to the accompanying drawings, in which—

Figure 1 is a longitudinal section showing the pin in locked position. Fig. 2 is another section showing the parts in releasing position. Fig. 3 is a section on line X—X, Fig. 1.

Various devices have been employed for concealing the points of hat pins or for holding stick pins in their place, but considerable difficulty is experienced in removing such devices, because it is necessary to use both hands for the purpose.

My invention is designed to overcome this difficulty and to enable the user to disengage the protecting device with one hand, leaving the other free to remove the pin.

As shown in the drawings, A represents the pin.

2 is an inner tube and 5 an outer casing. The inner tube is closed at the rear end and has a divergent mouth, as shown at 2ª, preferably of somewhat larger diameter than the end of the outer casing.

3 is a cam having a pivot pin 3ª, upon which it is turnable, with the convex curvature of the cam projecting through a slot in the inner tube 2 sufficiently so that when the pin is passed into the inner tube, it will engage with the curvature of the cam and will be locked thereby against the opposite side of the tube. The end 3ᵇ of the cam passes out through an opening in the side of the casing 5, and it will be seen that the cam may be operated to bind or release the pin by simply moving the casing longitudinally with relation to the inner tube so that the cam will be tilted in one direction or the other by this action.

4 is a spring, the rear end of which rests against the closed end of the casing 5 and the opposite end contacts with a collar 6, which is fixed to the inner tube 2, as shown. It will be seen, therefore that when the pin is pushed into the inner tube, it forces the tube backward against the pressure of the spring, and by thus tilting the cam 3, allows the pin to pass into the tube. As soon as pressure is released, the spring forces the inner tube forward and pressure of the opening in the outer casing 5, through which the arm 3ᵇ of the cam passes, causes the cam to move so as to bind upon the pin and hold it firmly in place. When it is desired to release the pin, the operator presses upon the flaring part 2ª, using only one hand for the purpose and thus pushing it backward, causing the cam to tilt by reason of its connection between the two tubes, so as to release the pin and allow it to be withdrawn. To limit the movement and prevent the separation of the different parts, suitable pins 8 are provided.

Having thus described my invention, what I claim and desire to secure by Letters Patent is—

A guard and protecting device for hat pins, said device comprising an inner tube having a slot therein, an outer casing having an opening therethrough in substantial alinement with said slot, a cam fulcrumed in the slot in the inner tube and having an arm extending through the opening in the outer casing, a collar upon the inner tube, and a spring acting between the bottom of the casing and the collar to force the inner tube forward and cause the cam to grip the pin.

In testimony whereof I have hereunto set my hand in the presence of two subscribing witnesses.

CHARLES A. HUFFMASTER.

Witnesses:
C. A. PERRY,
A. B. THOMAS.

Copies of this patent may be obtained for five cents each, by addressing the "Commissioner of Patents Washington, D. C."